United States Patent
Zhang et al.

(10) Patent No.: US 11,385,784 B2
(45) Date of Patent: Jul. 12, 2022

(54) SYSTEMS AND METHODS FOR CONFIGURING THE USER INTERFACE OF A MOBILE DEVICE

(71) Applicant: Citrix Systems, Inc., Fort Lauderdale, FL (US)

(72) Inventors: Cheng Zhang, Nanjing (CN); Qin Zhang, Nanjing (CN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 16/264,056

(22) Filed: Jan. 31, 2019

(65) Prior Publication Data
US 2020/0249824 A1    Aug. 6, 2020

(51) Int. Cl.
*G06F 3/04845*   (2022.01)
*G06F 3/01*       (2006.01)
*G06F 3/0482*     (2013.01)

(52) U.S. Cl.
CPC .......... *G06F 3/04845* (2013.01); *G06F 3/011* (2013.01); *G06F 3/017* (2013.01); *G06F 3/0482* (2013.01)

(58) Field of Classification Search
CPC .. G06F 3/04886; G06F 3/04845; G06F 3/011; G06F 3/017; G06F 3/0482
See application file for complete search history.

(56) References Cited

U.S. PATENT DOCUMENTS

| | | | |
|---|---|---|---|
| 9,146,631 B1 | 9/2015 | Gray et al. | |
| 2013/0093680 A1* | 4/2013 | Ogita | H01Q 1/243 345/168 |
| 2013/0300668 A1* | 11/2013 | Churikov | G06F 3/041 345/168 |
| 2014/0085220 A1* | 3/2014 | Gossweiler, III | G06F 3/0488 345/173 |
| 2015/0077381 A1* | 3/2015 | Park | G06F 3/013 345/174 |
| 2016/0179338 A1* | 6/2016 | Miller | G06F 1/1684 345/174 |
| 2017/0038847 A1* | 2/2017 | Schorsch | H04W 12/04 |
| 2017/0060398 A1* | 3/2017 | Rastogi | G06F 3/0414 |
| 2017/0193261 A1* | 7/2017 | Schwartz | G06K 9/00026 |
| 2018/0329580 A1* | 11/2018 | Aurongzeb | G06F 1/1652 |
| 2018/0329605 A1* | 11/2018 | Venkateswararao | G06F 3/0482 |
| 2018/0335939 A1* | 11/2018 | Karunamuni | G06F 3/04883 |
| 2019/0354281 A1* | 11/2019 | Bostick | G06F 3/04886 |
| 2020/0073507 A1* | 3/2020 | Hung | G06F 3/0488 |

OTHER PUBLICATIONS

Nagesh, Kr & Sahoo, P. & Ashoka, B.. (2012). Determination of hand from a fingerprint. Journal of Punjab Academy of Forensic Medicine and Toxicology. 12. 82-86.

* cited by examiner

*Primary Examiner* — Beau D Spratt
(74) *Attorney, Agent, or Firm* — Fox Rothschild LLP

(57) ABSTRACT

Systems and methods for adjusting a user interface presented in a mobile device display. A method for adjusting a user interface presented on a mobile device display includes receiving sensor data from one or more sensors of a mobile device, determining a hand of a user that is holding the mobile device based on the received sensor data, and adjusting the user interface presented on the mobile device display based on the determination.

20 Claims, 6 Drawing Sheets

SYSTEMS AND METHODS FOR CONFIGURING THE USER INTERFACE OF A MOBILE DEVICE

BACKGROUND

Statement of the Technical Field

The present disclosure relates generally to mobile devices. More particularly, the present disclosure relates to implementing systems and methods for configuring the layout presented on the user interface of mobile devices.

Background

As communications technologies develop, smartphones have increasingly become a part of people's daily life. Such smartphones allow users to record/input personal information or business-related information therein. Moreover, remote access systems have enabled users to access applications on servers from various portals. With the increasing prevalence of smartphone technology, users can also access applications on those servers from handheld smartphone. As these devices continue to grow in popularity and people continue to use them for an ever-growing number of reasons, the users of these devices have demanded and will continue to demand greater convenience, functionality, and ease-of-use.

SUMMARY

The present disclosure concerns implementing systems and methods for adjusting a user interface presented in a mobile device display. The methods comprise: receiving sensor data from one or more sensors of a mobile device, determining a hand of a user that is holding the mobile device based on the received sensor data (i.e., the left hand or the right hand), and adjusting the user interface presented on the mobile device display based on the determination.

In some scenarios adjusting the user interface presented on the mobile device display based on the determination may include relocating at least one user interaction element of the user interface from a first location to a second location. The first location is different from the second location. Optionally, the second location may make the at least one user interface element accessible to a digit (e.g., thumb) of the hand of the user that is determined to be holding the mobile device. This may include positioning the at least one user interaction element in a lower right side of the mobile device display in response to determining that the user is holding the mobile device with the right hand and/or positioning the at least one user interaction element in a lower left side of the mobile device display in response to determining that the user is holding the mobile device with the left hand.

In some other scenarios, adjusting the user interface presented on the mobile device display based on the determination may include relocating at least one content element of the user interface from a first location to a second location where the first location different from the second location. Optionally, the second location may be chosen to allow the user to view the at least one user content element without concealment by the hand of the user that is determined to be holding the mobile device. This may include positioning the at least one content element in a left portion of the mobile device display in response to determining that the user is holding the mobile device with the right hand and/or positioning the at least one content element in a right portion of the mobile device display in response to determining that the user is holding the mobile device with the left hand.

In certain scenarios, the method may also include determining that the user is holding the mobile device with a left hand based on received data that indicates a thumb impression with an orientation from a bottom left side of the display to a top left right of the display. Optionally, the method may include determining that the user is holding the mobile device with a right hand based on received data that indicates a thumb impression with an orientation from a bottom right side of the display to a top left side of the display.

In at least one scenario, the method may include adjusting the user interface presented on the mobile device display by analyzing the received sensor data to identify a pattern of movement performed by the user using the mobile device, and determining if the identified pattern of movement is associated with one or more user instructions for adjusting the user interface.

In another scenario, the system may include a mobile device comprising a display configured to present a user interface to a user, one or more sensors, and a processor. The processor may be configured to receive sensor data from the one or more sensors, determine a hand of the user that is holding the mobile device based on the received sensor data, and adjust the user interface presented on the display based on the determination. In certain such scenarios, the determination may be based on analysis of sensor data corresponding to one or more of the following: fingerprint of the user obtained using a fingerprint sensor of the mobile device, an orientation of the mobile device during a pick up action performed by the user, a pattern associated with a movement of the mobile device, and/or an orientation of a thumb of the user.

BRIEF DESCRIPTION OF THE DRAWINGS

The present solution will be described with reference to the following drawing figures, in which like numerals represent like items throughout the figures.

DETAILED DESCRIPTION

Figure 1:
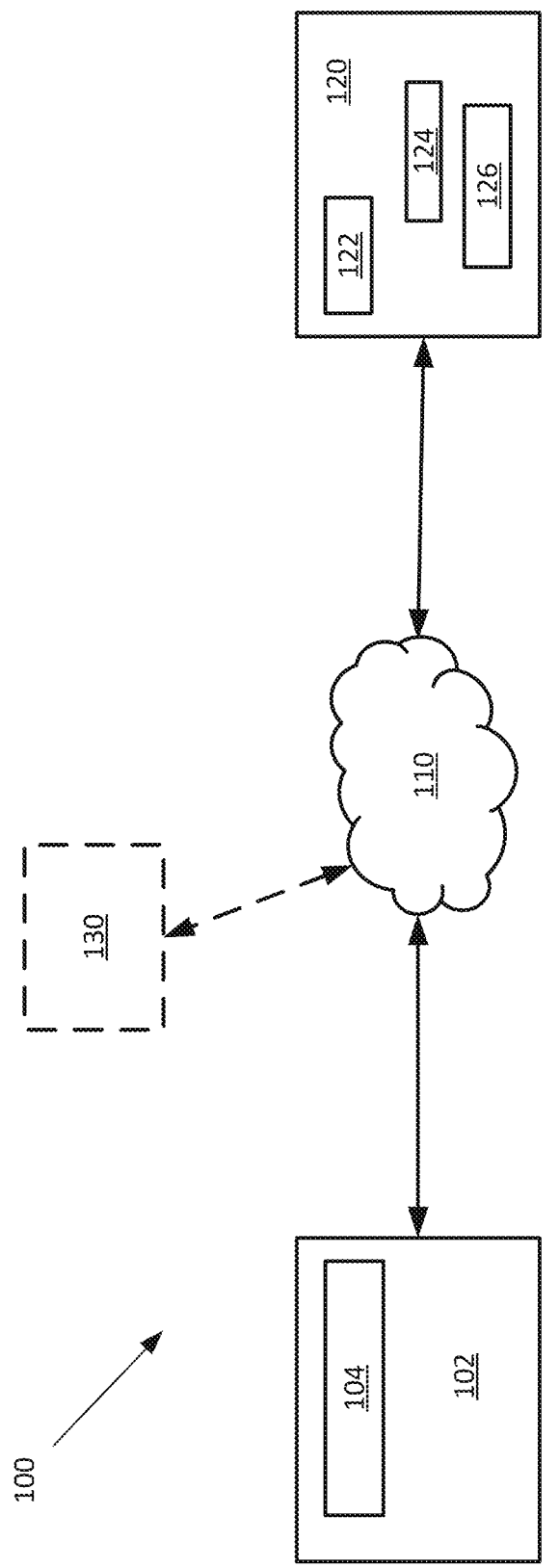
FIG. 1 illustrates example components of a system according to the embodiments of the present disclosure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The terms "computing device" and "electronic device" interchangeably refer to a device having a processor and a non-transitory, computer-readable medium (i.e., memory). The memory may contain programming instructions in the form of a software application that, when executed by the processor, causes the device to perform one or more processing operations according to the programming instructions. An electronic device also may include additional components such as a touch-sensitive display device that serves as a user interface. An electronic device also may include one or more communication hardware components such as a transmitter and/or receiver that will enable the device to send and/or receive signals to and/or from other devices, whether via a communications network or via near-field or short-range communication protocols. If so, the programming instructions may be stored on the remote device and executed on the processor of the computing device as in a thin client or Internet of Things (IoT) arrangement. Example components of an electronic device are discussed below in the context of FIG. 2. The term "mobile device" refers to a portable computing device, typically having a display screen with touch input and/or a miniature keyboard. Examples of mobile devices include, without limitation, smartphones, cellular phones, laptop computers, personal digital assistants, cameras, tablet devices, electronic readers, watches, fitness devices, media players, satellite navigation devices, or the like.

The terms "memory," "memory device," "computer-readable medium" and "data store" each refer to a non-transitory device on which computer-readable data, programming instructions or both are stored. Unless the context specifically states that a single device is required or that multiple devices are required, the terms "memory," "memory device," "computer-readable medium" and "data store" include both the singular and plural embodiments, as well as portions of such devices such as memory sectors.

A "processor" or "processing device" is a hardware component of an electronic device that is configured to execute programming instructions. The term "processor" may refer to a single processor or to multiple processors that together implement various steps of a process. Unless the context specifically states that a single processor is required or that multiple processors are required, the term "processor" includes both the singular and plural embodiments.

The term "digit" can refer to a thumb, an index finger, a middle finger, a ring finger, a pinky finger, or any other limb/appendage of a hand.

Mobile devices typically include a display screen for presenting content such as text, videos, and pictures to a user. When the display screen is a touch sensitive interface, it may also be used to provide a user interface for receiving user input (for example, via a keyboard displayed on the display screen). Often times, users of mobile devices hold and operate the mobile device using one hand, i.e., the left hand or the right hand. However, the content and user interaction elements on the display screen are displayed at preset and/or fixed locations on the display screen relative to the size or configuration of the display or mobile device. As such, the hand with which a user holds the mobile device may have difficulty interacting with these preset and/or fixed content or user interaction elements of the display. For example, content or user interaction elements configured to be displayed at a particular location on a display screen may be blocked from view by the user's hand that is holding the device. Similarly, based on the hand used to hold the mobile device, an input element or user interaction element that is configured to be presented at a location on the device that is difficult for the user's hand to access (e.g., for the user's thumb/finger to reach) may make it difficult or inconvenient for the user to operate the mobile device. For example, a user holding a bottom right corner of the electronic device cannot reach the upper left corner of the device with the right thumb in order to perform a touch operation. Likewise, a user holding a bottom left corner of the electronic device cannot reach the upper right corner of the device with the left thumb in order to perform a touch operation. In such situations, the user may have to switch the mobile device to a different hand in order to reach and interact with some elements, which slows down the interaction and may also lead to movement and unintentional contacts with the device that could be misinterpreted as gestures.

The current disclosure recognizes that mobile devices may be held and operated using one hand only, i.e., either the left hand or the right hand of a user. Holding and operating the mobile device allows a user to use the other hand for performing various tasks such as, without limitation, hold a bag, holding on the rail of a moving bus, etc. Various embodiments of the present disclosure can determine which hand of a user is holding a mobile device. For example, utilizing one or more sensors of the mobile device, the mobile device can identify whether the user is holding the mobile device using the left hand or the right hand. Furthermore, based on the identification, various embodiments of the present disclosure can configure the mobile device (e.g., select a layout mode, modify applications executing on the device, etc.) to improve the functionality (e.g., display) of the mobile device. In other words, the mobile device is able to smoothly react and dynamically adapt its functionalities such as the user interface based on the identification of which hand is holding the mobile device.

The present disclosure will now be described in detail with reference to the figures. FIG. 1 is a functional block diagram illustrating an example system 100 in accordance with the present disclosure. In certain embodiments, the system 100 includes a server 102 and a mobile device 120 in communication with each other via network 110. Many modifications to the depicted system may be made by those skilled in the art without departing from the scope of the disclosure as recited by the claims.

In some embodiments, server 102 may be a laptop computer, a tablet computer, a netbook computer, a personal computer (PC), a desktop computer, a personal digital assistant (PDA), a smart phone, or any programmable computer system known in the art. In certain embodiments, server 102 represents a computer system utilizing clustered computers and components (e.g., database server computers, application server computers, etc.) that act as a single pool of seamless resources when accessed through network 110, as is common in data centers and with cloud-computing applications. In general, server 102 is representative of any programmable electronic device or combination of programmable electronic devices capable of executing machine readable program instructions and communicating with client computers, such as mobile device 120 via network 110. Server 102 may include components, as depicted and described in further detail with respect to FIG. 6, in accordance with embodiments of the present disclosure.

The server 102 may include remote storage 104 (e.g., databases) and various programs (not shown). For example, the server 102, in some embodiments, executes a remote presentation client or other client or program that uses a thin-client or remote-display protocol to capture display output generated by an application executing on server 102 and transmits the application display output to the mobile device 120. The thin-client or remote-display protocol can be any now or hereafter known protocols.

The server 102, in some embodiments, can be any server type. In other embodiments, the server 102 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 102 executing an active directory; or a server 102 executing an application acceleration program that provides firewall functionality, application functionality, or load balancing functionality.

In one embodiment, mobile device 120 and server 102 may communicate through network 110. Network 110 can be, for example, a local area network (LAN), a telecommunications network, a wireless local area network (WLAN), a wide area network (WAN) such as the Internet, or any combination of the previous, and can include wired, wireless, or fiber optic connections. In general, network 110 can be any combination of connections and protocols that will support communications between mobile device 120 and server 102, in accordance with embodiments of the present solution. In another embodiment, network 110 operates locally via wired, wireless, or optical connections and can be any combination of connections and protocols (e.g., NFC, laser, infrared, etc.).

Optionally, the system 100 may also include remote information stores 130 in communication the mobile device 120 and/or the server 102, via the network 110.

The mobile device 120 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a mobile device 120 that displays application output generated by an application remotely executing on a server 102 or other remotely located machine. In these embodiments, the mobile device 120 can display the application output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded. The current disclosure describes adjusting the display corresponding to the application based on an identification of whether a user is using the left hand or the right hand to hold and/or operate the mobile device As shown in FIG. 1, mobile device 120 may include a user interface (UI) 122, a local storage 124, and a sensor module 126.

In certain embodiments, the user interface (UI) 122 may allow a user to interact with the mobile device 120. The UI 122 may allow the interaction via a singular device (e.g., as a touch screen display) that provides both input to a graphical user interface (GUI) of the mobile device 120 as well as output for presenting content such as icons or other user interaction elements (e.g., various icons, keyboard, buttons, or the like that require user touch interaction) associated with software applications and/or images depicting the executing software application. Optionally, a software application may generate UI 122, operating within the GUI of mobile device 120. The UI 122 may accept input from a plurality of input/output (I/O) devices (not shown) including, without limitation, a tactile sensor interface (e.g., a touch screen, a touchpad, etc.) or a natural user interface (e.g., voice control unit, motion capture device, stylus, etc.). Alternatively and/or additionally, an I/O device interfacing with UI 122 may be connected to mobile device 120 which may operate utilizing wired (e.g., USB port) or wireless network communications (e.g., infrared, NFC, etc.). For example, an I/O device may be a peripheral, such as a keyboard, a mouse, a trackball, and a click wheel that provide input from a user.

In one or more embodiments, the local storage 124 may store various user profiles for configuring the layout presented on the UI 122 of the mobile device 120 based on received sensor data and/or user instructions. Information included in a user profile may include, without limitation, left hand fingerprints for one or more users associated with the mobile device 120, right hand fingerprints for one or more users associated with the mobile device 120, user credentials, gestures that a user may perform to cause the mobile device 120 to perform one or more functions, a rule set for performing mode detection (left hand mode or right hand mode), a rule set for configuring the UI 122 based on the detected mode, or the like.

The local storage 124 may also store layouts of the UI 122 and corresponding to one or more software applications on the mobile device 120. One or more of the stored layouts may include a left hand mode, a right hand mode, and/or a static mode or default mode (not shown here). The static mode may correspond to a layout presented on the UI 122 when, for example, the mobile device cannot determine the hand with which a user is holding the mobile device, when the user is holding the device with one hand and operating it with the other, and/or when the static mode layout allows for easy operability and access with both hands. In certain embodiments, the static mode layout may be similar to the layout in the left hand mode or the right hand mode. For example, if the user profile of a user indicates that the user is right handed and the mobile device cannot determine the hand with which the user is holding the mobile device, the UI 122 may display a static mode that is similar to the layout in the right hand mode (e.g., as shown in FIGS. 2A and 3A).

The left hand mode of a layout may be a design and/or arrangement of user interaction elements and/or content that is displayed on the UI 122 when a user is holding and operating the mobile device 120 using the left hand. The layout in the left hand mode is configured for easy accessibility of user interaction elements presented on the user interface to a user's left hand (e.g., thumb). Alternatively and/or additionally, in the left hand mode the layout of the content (e.g., images, user interaction elements) displayed on the UI 122 may be configured such that the content is not obscured by the left hand holding the mobile device 120 (e.g., by moving the content for display on the right side of the UI 122). For example, content or user interaction elements configured to be displayed on the bottom left portion of the UI 122 may be blocked from view by the palm of a user holding the mobile device with the left hand and operating it using the left hand thumb. Hence, the layout in the left hand mode may be configured such that content and/or user interaction elements on the UI 122 are easily accessible but not obscured by the hand holding the device.

Similarly, the right hand mode of a layout may be a design and/or layout of user interaction elements and/or content that is displayed on the UI 122 when a user is holding and operating the mobile device 120 using the right hand. The layout in the right hand mode is configured for easy accessibility of the user interaction elements to a user's right hand (e.g., thumb). Alternatively and/or additionally, in the right hand mode the layout of the content (e.g., images, user interaction elements) displayed on the UI 122 may be configured such that the content is not obscured by the right hand holding the mobile device 120 (e.g., by moving the content for display on the left side of the UI 122). For example, if it is determined that the user's right hand is holding the mobile device 120, then content may be displayed on a left portion of the UI 122 such that the content is not blocked from view by the user's right hand holding the mobile device 120. In another example, if the mobile device 120 determines that the user's left hand is holding the mobile device 120 then user interaction elements may be displayed in the lower left area of the UI 122 such that they are closer and/or more convenient for the thumb of the user's left hand.

In one or more embodiments, the layout of the user interaction elements on the UI 122 in the left hand mode may be selected such that they are placed close to and/or at a distance operable by the left thumb of a user for a convenient one-hand (left-hand) operation (e.g., by shifting the user interaction elements to the lower left side of the UI 122) while ensuring that they not blocked from view by the left hand of the user. In one or more embodiments, the layout of the user interaction elements on the UI 122 in the right hand mode may be selected such that they are placed close to and/or at a distance operable by the right thumb of a user for a convenient one-hand (right-hand) operation (e.g., by shifting the user interaction elements to the lower right side of the UI 122) while ensuring that they not blocked from view by the right hand of the user. For example, as shown in FIGS. 2A and 2B, certain user interaction elements 201 included in the layout of a software application being executed on the mobile device 120 are displayed on the right side of the UI 122 (FIG. 2A) illustrating the right hand mode, and on the left side of the UI 122 (FIG. 2B) illustrating the left hand mode.

The placement of the user interaction elements 201 on the lower right side in the right hand mode makes them easily accessible to the right thumb of a user when holding the mobile device 120 with the right hand, and on the lower left side in the left hand mode to the left thumb of a user when holding the mobile device 120 with the left hand, respectively. The user interaction elements 201 are made easily accessible because if they are placed closer to the sides of the UI 122 (left side in the left hand mode and right side in the right hand mode), the user no longer has to stretch his/her thumbs to reach the user interaction elements 201 when using the device 120 with a single hand. To this end, the arrangement of elements 201 within the UI 122 prevents inadvertent input of information into the device 120 (e.g., pressing the wrong or multiple keys on a touch screen display) caused by over extension or stretching of a user's hand (e.g., a thumb) when inputting information. Optionally, user interaction elements 201 that were placed in a location that is not within the reach of the user's thumb are now placed where they can be reached by the thumb of the hand holding the mobile device.

Figure 2B:
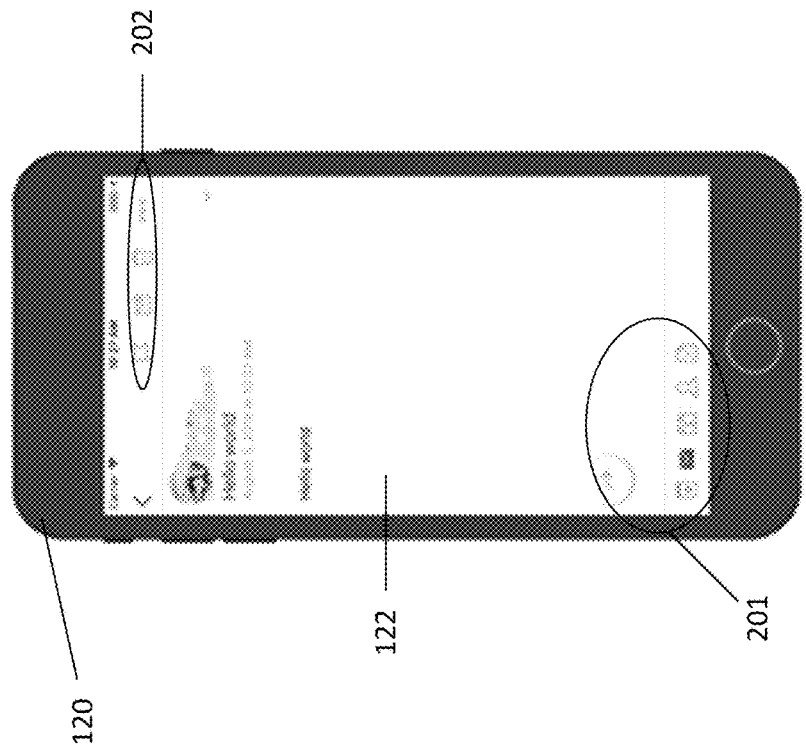
FIGS. 2A and 2B illustrate example layouts of mobile device when the user if holding the device with a right hand and when the user if holding the device with a left hand, respectively.
Figure 2A:
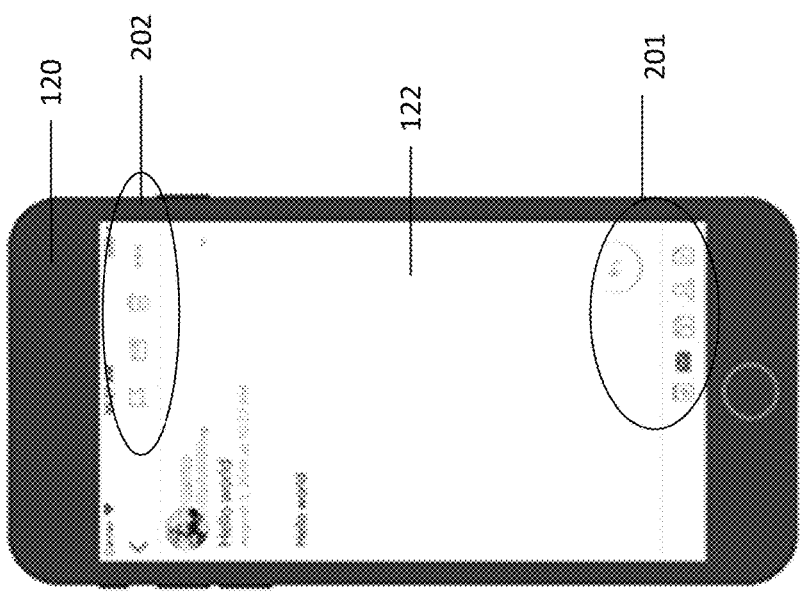
Figure 3A:
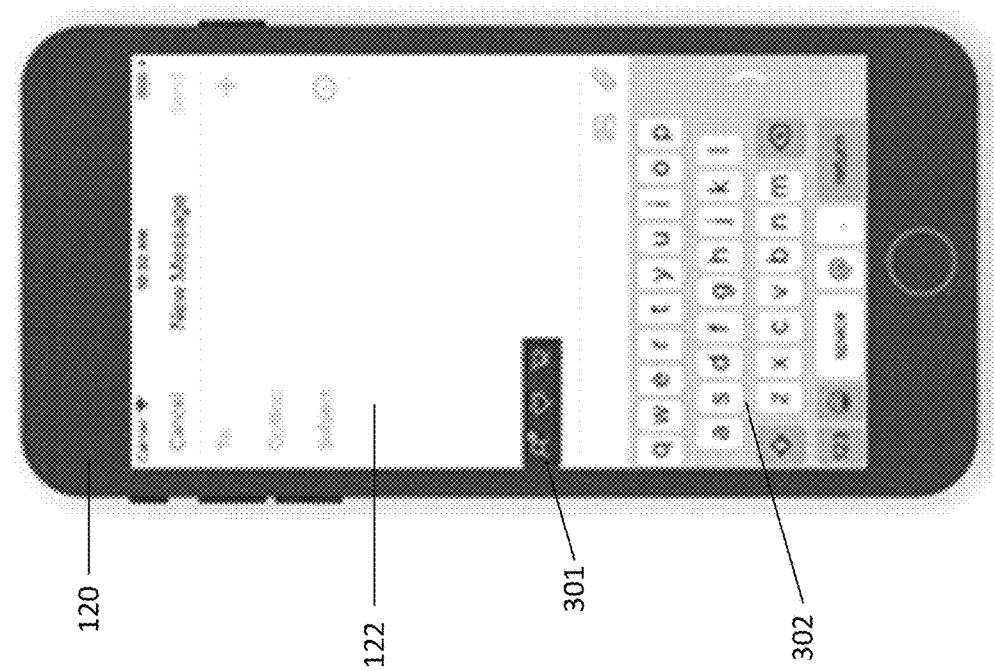
FIGS. 3A and 3B illustrate example layouts of mobile device when the user if holding the device with a right hand and when the user if holding the device with a left hand, respectively.

As shown in FIGS. 2A and 2B, the locations of certain user interaction elements 202 may be fixed in location irrespective of the right hand mode or the left hand mode operation. Examples of such user interaction elements 202 may include, user interaction elements configured to be unchangeable in location by a user, administrator, application developer, etc.; user interaction elements that require two hand for operation (e.g., user interaction elements 202 that are in the top portion of a display and cannot be reached by the thumb of a user when holding the device with one hand); or the like.

Figure 3B:

Similarly, FIGS. 3A and 3B illustrate the right hand mode and the left hand mode, respectively, associated with an email application executing on mobile device 120. As shown in FIG. 3A, in the right hand mode, user interaction elements 301 are displayed on the right side of the UI 122, and the keyboard 302 is displayed in a right hand mode that allows easy operability using the right thumb of a user. Similarly, as shown in FIG. 3B, in the left hand mode, user interaction elements 301 are displayed on the left side of the UI 122, and the keyboard 302 is displayed in a left hand mode that allows easy operability using the left thumb of a user.

In a static mode (not shown here), the layout of user interaction elements and content displayed on the UI 122 does not change based on the hand holding the device. For example, layout of an application interface that requires two-handed operation, layout of an application interface that provides easy accessibility for single-handed operation by both hands and/or does not cause concealment of content by a user's hand, layout when the mobile device cannot determine the hand with which a user is holding the mobile device, or the like. The UI 122 may display the static mode layout when for example, the mobile device cannot determine the hand with which a user is holding the mobile device, the application requires display of a certain layout on the UI 122 irrespective of the hand determined to be holding the mobile device, or the like. For example, if the layout only includes user interaction elements that are displayed in a portion of the UI 122 that cannot be accessed using a thumb in a single hand operation mode (e.g., if the UI 122 in FIGS. 2A and 2B includes user interaction elements 202 only), it may be a static mode layout that remains unchanged irrespective of the hand with which a user is holding a device.

While the above disclosure describes creating and storing the left hand mode and/or the right hand mode for the software application of the mobile device 120, the disclosure is not so limiting, and the left hand mode and/or the right hand mode layouts may be created when a user is operating the mobile device (for example, after determining whether the a user is holding the mobile device 120 with the left hand or with the right hand).

In one or more embodiments, the system may automatically create the layouts for the left hand mode, the right hand mode, and/or the static mode of applications executing on the mobile device 120 based on one or more rules. The rules may include, without limitation, minimizing distance of user interface elements from the thumb of hand holding the mobile device, keeping the distance of user interface elements from the thumb of hand holding the mobile device below a threshold distance, prevent concealment of content displayed by hand holding the device, or the like. For example, as discussed above, the system may create the layout such that the user interface elements in a left hand mode may be displayed on the bottom left corner of the UI 122 and may be positioned such that the distance between each of the user interface elements and the left thumb is less than a predefined length. The predefined length may be, for example, the maximum reach of the left hand thumb on the UI 122 of the actual user of the mobile device, of an average user, etc.

Alternatively and/or additionally, a user may provide feedback for creation of the layouts for the left hand mode, the right hand mode, and/or the static mode of applications executing on the mobile device 120. For example, a user may prompt the system to configure the layout if certain user interface elements are not easily accessible to the user in a left hand mode and/or a right hand mode. Optionally, the user may also provide feedback to the system if his/her holding style blocks certain content or user interface elements from view. The user may provide directions (e.g., location, distance, etc.) to the system regarding placement of the user interface elements or content as per his/her convenience in the left hand mode, the right hand mode, and/or the static mode. To this end, the feedback enables the system to create a customized UI layout that fits or otherwise accommodates the user's physical characteristics or preferences.

In some other embodiments, one or more software applications may be associated with pre-configured left hand mode and/or right hand mode displays (for example, provided by the software application developers). Hence, the system need not create the left hand mode and/or the right hand mode layouts and may present the appropriate layout based on the determination of which hand is holding the mobile device.

Referring back to FIG. 1, in at least one embodiment, the sensor module 126 may include one or more sensors such as, without limitation, fingerprint sensors, orientation sensors (e.g., accelerometer, gyroscope, compasses, magnetometers, inertia sensors, virtual orientation sensors, etc.), input device/digit proximity sensors, touch sensors, optical sensors, camera, thermal sensors, moisture sensors, or the like.

Data collected by one or more sensors of the sensor module 126 may be used to determine whether a user is holding the mobile device 120 with the left hand or with the right hand. It should be noted that the same user could use either the left hand or the right hand to hold and/or operate the device.

In certain embodiments, data collected by the fingerprint sensors may be used to determine whether the user is holding the device with the left hand or the right hand. A user may be prompted to provide a fingerprint for, for example, authentication before unlocking the mobile device, authentication before unlocking one or more applications, new user registration, authentication before waking up from a low energy state, upon power on, or the like.

In certain embodiments, the system may store or may have access to labeled fingerprints of users indicating whether a fingerprint is associated with the left hand or the right hand digit of a user. Upon receipt of a fingerprint from a user, the system may find a match for the received fingerprint from amongst the stored fingerprints and use the labels to determine whether the user is holding the device with the left hand or the right hand. For example, the system may prompt a user to indicate whether the fingerprints associated with the user and stored in the system correspond to the left hand or to the right hand digits (either at the time of registering the fingerprints and/or at a later time). Alternatively and/or additionally, the system may automatically label the stored fingerprints by identifying whether a fingerprint is associated with a right hand digit or a left hand digit of a user. The system may identify whether a fingerprint is associated with a right hand digit or a left hand digit of a user by, for example, analyzing the patterns (e.g., swirls) and characteristics of a recorded fingerprint to determine whether it is a left hand digit fingerprint or a right hand digit fingerprint. For example, the system may analyze the received and/or recorded fingerprints for similarities with right hand digit and/or left hand digit labeled fingerprints stored in one or more databases accessible to the system. Other now or hereafter known methods and systems for identifying whether a fingerprint is associated with a right hand digit or a left hand digit of a user are within the scope of this disclosure.

In certain embodiments, the system may not store the labels and may make the determination of whether a fingerprint is associated with a right hand digit or a left hand digit of a user when the fingerprint is received from a user.

In an example embodiment, mobile device orientation data collected by sensors (e.g., accelerometer, gyroscope, etc.) may indicate an orientation towards the left or right side, depending on how the user is holding the mobile device 120. A change in the orientation of the mobile device 120 can be caused by a tilt, turn, twist, movement, etc. For example, when a user picks up the mobile device 120 from a flat position with the right hand, he/she may pick up the right side of the mobile device 120 first such that the right side is elevated above the left. As such, a difference in elevation of the left side and the right side of the mobile device from a flat position and/or a change in difference in elevation of the left side and the right side of the mobile device from a resting position (that is not flat) concurrent with and/or before detecting user's operation of the mobile device may be used to determine the hand holding the mobile device. For example, if the left side is elevated compared to the right side, the user may be holding the mobile device with the left hand, and/or vice versa.

In certain embodiments, data collected by the sensors (e.g., accelerometer, gyroscope, magnetometer, etc.) may also be analyzed to determine if a user has performed a movement pattern with the mobile device 120 that corresponds to specific user instructions. For example, the collected data may be analyzed to estimate orientation data of the mobile device 120. Examples of orientation data may include, without limitation, roll (how a mobile device is tilted side to side), pitch (how a mobile device is tilted front to back), yaw (the direction a mobile device is facing in a horizontal plane), azimuthal (angle between the longitudinal axis of the mobile device and the Earth's magnetic field), the rates of change of yaw pitch and/or roll, or the like.

The system may then analyze the estimated orientation data to determine if the mobile device executed a pattern of movement (such as a specific up-down gesture, left-right gesture, rotation, flick, etc.) that corresponds to a particular user instruction. One or more patterns of movement and corresponding user instructions may be stored in the local storage 124 and/or the remote storage 104. In one or more embodiments, the patterns of movements corresponding to user selections may be selected such that they reduce the likelihood that the patterns may be performed unintentionally by a user while using the mobile device 120. For example, movement of the mobile device 120 in a clockwise and/or anticlockwise direction for a certain number of times, formation of certain alphabets and/or numbers by moving the mobile device 120 in the shape of the alphabet, number, and/or other patterns, flick of the mobile device 120 for at least a certain number of times and/or at a minimum angle. For example, a specific pattern of movement of the mobile device 120 can correspond to a user instruction that serves as an identification received from the user indicating whether the user is holding the device with the left hand (e.g., a user forming an "L" by moving the mobile device) or the right hand (e.g., a user forming an "R" by moving the mobile device). In another example, a user may associate a tilt angle of the mobile device performed within a certain time period (e.g., at least 30 degrees within 2 seconds) as an instruction to switch the mode from left hand mode to a right hand mode, or vice versa. In other examples, other patterns of movement may be associated with user instruction that instruct the system that its identification of the hand holding the mobile vice is wrong, use a particular mode layout irrespective of the hand holding the device, or the like.

For example, if the system determines that an "L" shaped pattern has been formed by the movement of the mobile device 120, it consult the stored relationships between patterns of movements and user instructions to determine that the user is holding the mobile device 120 with his/her left hand.

Other sensors (e.g., capacitive touch array) can be configured to detect one or more digits (including thumbs) that touch and/or otherwise contact the sensors. A touch and/or contact may include a tap, pinch, scroll, or other types of interactions between a user's digits and the UI 122. As such, data collected by the sensors may indicate whether the user is holding the device with the left hand or the right hand. For example, when the user is holding the mobile device 120 with the right hand, sensors around the sides of the mobile device 120 may register a thumb contact at or near the right lateral side of the mobile device 120, and contact with the middle, ring, and/or little near the left lateral side of the mobile device 120. In another example, when the user is holding the mobile device 120 with the left hand, sensors around the sides of the mobile device 120 may register a thumb contact at or near the left lateral side of the mobile device 120, and contact with the middle, ring, and/or little finger near the right lateral side of the mobile device 120.

Alternatively and/or additionally, the shape and/or orientation of a thumb (or other digit) operating the mobile device 120 may be user to determine which hand is holding the mobile device 120. The shape and/or orientation of the thumb operating the mobile device 120 may be determined based on data collected by, for example, the fingerprint sensor discussed above, capacitive touch sensors (included in, for example, the display of the mobile device), thermal sensors (e.g., may register a heat impression when a thumb contacts the mobile device that can be analyzed to determine the shape and/or orientation of the digit), or the like.

Figure 4:
FIG. 4 illustrates example thumb impressions registered by the touch sensors of a mobile device.

When a user is operating the mobile device 120 with his/her left thumb, the shape and/or orientation of the left thumb may be a substantially oval imprint slanting from bottom left to upper right as shown in FIG. 4 (404). On the other hand, when a user is operating the mobile device 120 with his/her right thumb, the shape and/or orientation of right thumb of the user may be a substantially oval imprint 402 slanting from bottom right to upper left, Accordingly, the system can determine which hand is holding the mobile device 120 based on the detected shape and/or orientation of the digit (e.g., thumb) operating the device.

Similarly, sensors such as proximity sensors may detect presence of objects (e.g., finger, stylus, or the like) hovering above the front face of the mobile device 120 within a specified distance, without the object having to touch the device. Examples of proximity sensors may include electromagnetic field sensor, infrared sensor, capacitive sensor array capable of generating outward electric fields to detect a proximate object, etc. Based on data received from the proximity sensors, the mobile device 120 may determine the direction of a user's digits (e.g., thumb, forefinger for operating the mobile device, etc.) suspended and/or moving over the front face of the device. For example, if a user is holding the mobile device 120 with his/her left hand, the shape and/or orientation of the left thumb hovering over the mobile device display may be a substantially oval slanting from bottom left to upper right (similar to 404 in FIG. 4). On the other hand, when a user is operating the mobile device 120 with his/her right hand, the shape and/or orientation of right thumb hovering over the mobile device display may be a substantially oval imprint 402 slanting from bottom right to upper left.

In other embodiments, data from other sensors may be used for determining which hand is holding the mobile device. For example, orientation and/or shape of heat impression of one or more digits determined based on data collected using the thermal sensors may be used (as discussed above).

In one or more embodiments, the system may store information about a user's characteristic holding patterns, touch patterns, orientation patterns, or the like associated with the left hand and/or the right hand, and observed during prior uses of the mobile device 120. For example, the system may collect sensor data corresponding to the orientation or tilt angle of the mobile device 120 during prior pick up actions (when the user picks up the mobile device 120 with the right hand and starts to use it) and analyze the collected sensor data to determine if the orientation and/or tilt are within a certain range of values with respect to a reference plane (e.g., the horizontal plane) for each hand and for a particular user. Optionally, the system may determine if there are certain gestural patterns associated with performing the pick up action with the right hand versus the left hand that are characteristic for a user. The system may use a variety of methods (e.g., supervised or unsupervised machine learning, pattern matching and/or classification, regression, etc.) to determine such pattern ranges, gestural patterns, etc. It will be understood to those skilled in the art that such a system may be a continuous learning system that updates it reference values, patterns, or the like continuously based on observed behavior of a user. The system may then use the observed ranges and/or gestural patterns in analyzing the sensor data collected for future pick up actions.

Similarly, fingerprint patterns received for authentication with the right hand versus the left hand, touch inputs received while holding the device in the right hand versus the left hand, thumb motion patterns, and thumb print shapes and/or orientations observed, or the like, may be used as gestural patterns that have measurable attributes. Such measurable attributes may be analyzed and used to determine specific characteristic patterns associated with a user when that user is holding the device with the left hand or the right hand using a variety of methods (e.g., supervised or unsupervised machine learning, pattern matching and/or classification, regression, etc.).

In certain embodiments, a user may also provide reference values that may be used to determine the hand with which the user is holding the mobile device by analyzing data collected by each of the sensors. For example, the mobile device may receive one or more user thumb prints for the right hand and left hand, and may use the tilt and direction (e.g., average, range, etc.) in the received thumbprints as a reference for analyzing thumb prints received during usage.

It will be understood to those skilled in the art that while data collected by the fingerprint sensors may provide information about whether the user is holding the mobile device with the left hand or the right hand initially (e.g., upon unlocking the mobile device), data collected by other sensors (such as the touch sensors, and the proximity sensors) may provide real-time data information about whether the user is holding the mobile device with the left hand or the right hand. Accordingly, in some embodiments, the UI 122 may include an initial layout based on determining the hand with which a user is holding the device when the authentication fingerprint is receive, which may then be updated in real-time if the user switches the mobile phone between the two hands. For example, if the system determines, based on fingerprint data, that a left hand digit was used upon power-on of the mobile device, the system may display a layout on UI 122 in a left hand mode. However, if the user subsequently holds and operates the mobile device using his right, as determined by data collected from, for example, the touch sensors, the system may dynamically update the layout of the layout presented on the UI 122 to a right hand mode.

Hence, utilizing at least some of the above sensors either alone or working in combination, the mobile device 120 can determine whether the hand holding the mobile device 120 is a left hand or a right hand. In some embodiments, based on determining which hand (e.g., left or right) is holding the mobile device 120, the mobile device 120 can modify the layout and/or other characteristics of a layout presented to the user on the UI 122. In certain embodiments, data collected from various sensors for making the determination of whether a user is holding the mobile device 120 with the left hand or with the right hand may be given different weights or preferences. For example, data collected by touch sensors that can be used to determine the shape and/or orientation of the thumb operating the mobile device 120 may be given more weight compared to data collected by sensors (e.g., gyroscope) that detect a pick up action, because a user may pick up the mobile device with a first hand and then transfer it to the other hand for use and operation.

Figure 5:
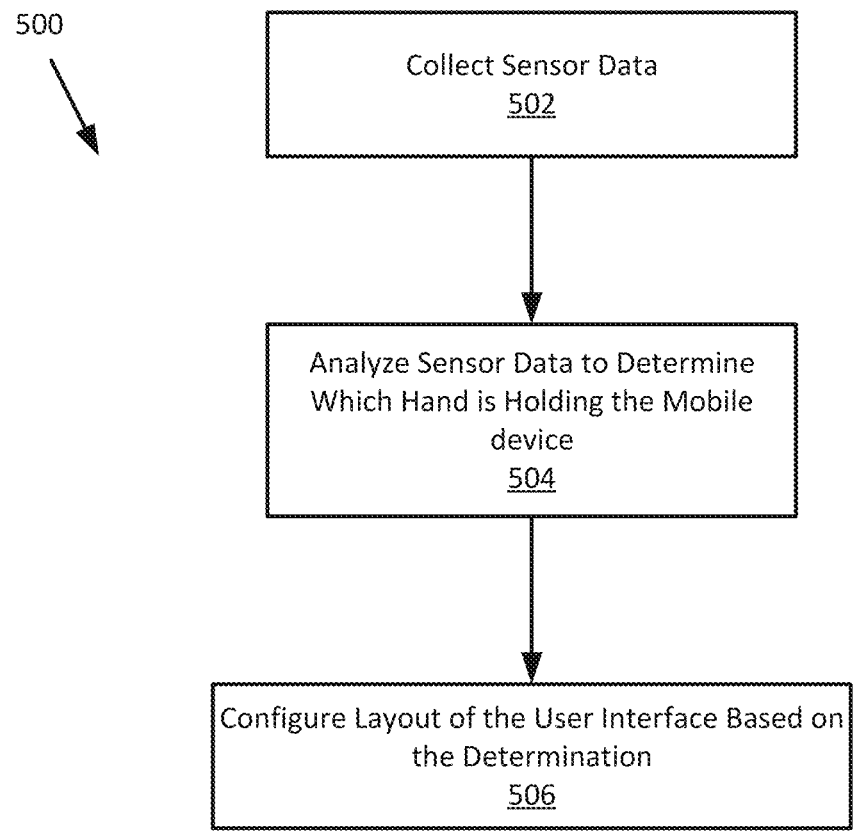
FIG. 5 is a flow chart illustrating the example method for configuring the layout of the user interface of a mobile device according to the embodiments of the present disclosure.

Referring now to FIG. 5, an exemplary flowchart in accordance with various embodiments illustrating and describing a method of determining whether a user is holding a mobile device with the left hand or with the right hand is described. While the method 500 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 5 but the process may be integrated and/or one or more steps may be performed together, simultaneously, or the steps may be performed in the order disclosed or in an alternate order.

At 502, the system may collect sensor data from one or more sensors of the mobile device. As discussed above, fingerprint data may be collected when the mobile device is unlocked, powered on, activated from a sleep mode, or the like using a fingerprint based authentication/activation. Similarly, data from the sensors, such as accelerometers and/or gyroscope, may be collected when a user picks up the mobile device just before use, and may provide information about a hand used by the user to pick up the mobile device. On the other hand, data from sensors such as the capacitive touch sensors and the proximity sensors, may be collected as the user holds and operates the device. Finally, the system may also collect data corresponding to one or more gestures performed by the user with the (e.g., a flick, tap) using, for example, the accelerometer, gyroscope, magnetometer, or the like. The collection of data using such sensors is described above with respect to FIG. 1.

At 504, the system may analyze the collected sensor data to determine which hand a user is using to hold and operate the mobile device. As discusses above, fingerprint data may be analyzed to determine if the collected fingerprint data belongs to a right hand digit or a left hand digit based on, for example, labeled fingerprints. Data corresponding to the orientation of the device may provide information relating to the hand used to pick up the device. For example, a downward tilt of the right edge of the mobile device may indicate that the user is picking up the device with his/or left hand. Data collected by the touch sensors of a mobile device may be analyzed to determine the shape, orientation, or other characteristics of the impressions made by a user's digit (e.g., thumb) to determine the hand used by the user to hold and operate the mobile device. For example, an oval fingerprint impression that is orientated from the bottom left of the top of the mobile device to the upper right may be detected when the user is using his left thumb to operate the mobile device (as shown in FIG. 4).

At 506, the mobile device may configure a layout for display on the mobile device based on the determination of whether the user is holding and operating the mobile device with the left hand or the right hand. For example, if the user is determined to be holding and operating the mobile device with his/her left hand, the system may present a left hand mode layout on a user interface corresponding to the application being executed. On the other hand, if the user is determined to be holding and operating the mobile device with his/her right hand, the system may present a right hand mode layout on a user interface corresponding to the application being executed. As discussed above, the left hand mode may be configured to allow for easy accessibility of user interface elements with the left thumb of a user and/or may prevent concealment of the content displayed by the left hand of the user. Similarly, the right hand mode may be configured to allow for easy accessibility of user interface elements with the left thumb of a user and/or may prevent concealment of the content displayed by the right hand of the user.

In certain embodiments, a user may instruct the system to provide the user interface in the present layout corresponding to a chosen mode chosen by the user. For example, the user may wish to interact with the mobile device in a left hand mode even if he/she is holding the mobile device with his/her right hand. Alternatively and/or additionally, the user may provide user instruction if the determination made by the user regarding which hand is holding the mobile device is incorrect. Accordingly, the user may provide instructions to display a right hand mode layout. The user may provide the instruction by, for example, modifying one or more settings of the mobile device, by providing a voice instruction, by providing an instruction in the form of a gesture, or the like. For example, the system may store one or more instructions associated with gestures performed by the mobile device (e.g., flick in a particular manner, tap, rotate, or the like) such that when the system detects a gesture performed by the mobile device, it may execute the corresponding instructions. In an example embodiment, a vertical flip may be associated with instructions for implementing a right hand mode layout and a side flick may be associated with instructions for implementing a left hand mode layout. In some embodiments, the gestures and the corresponding instructions may be user specific and/or associated with a particular user.

Figure 6:
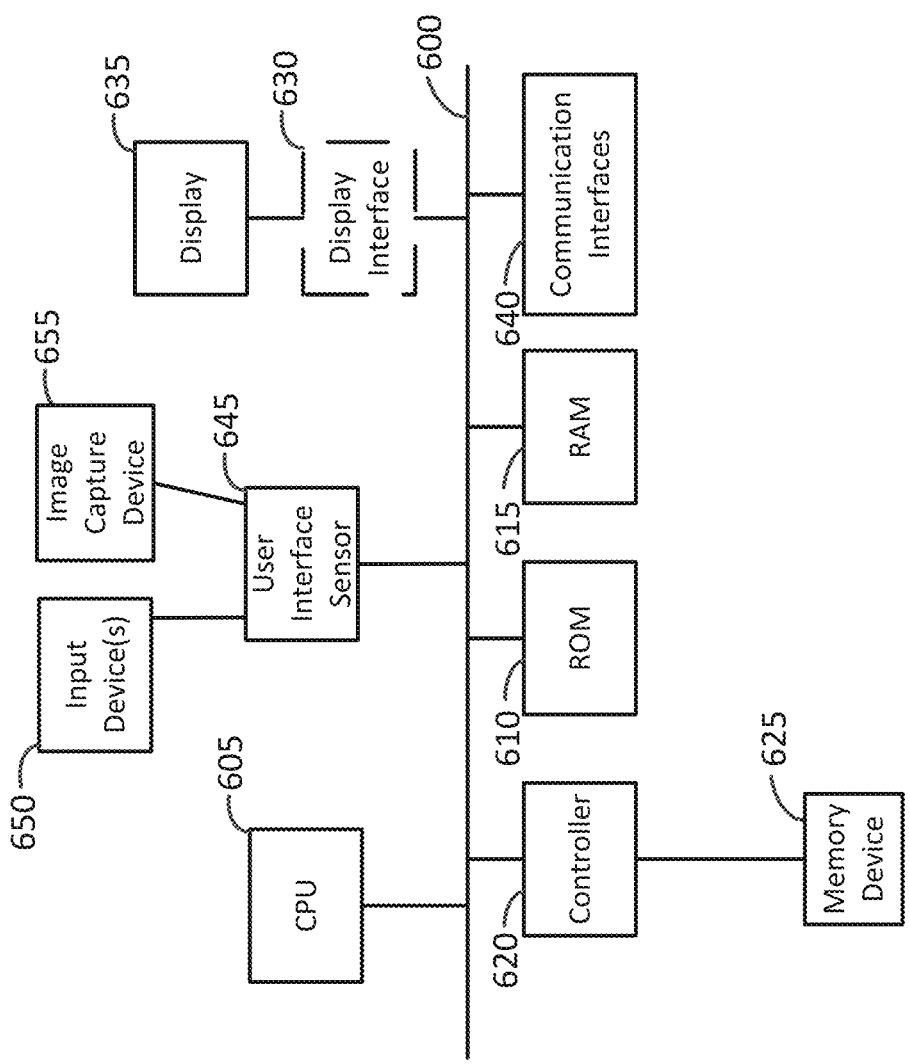
FIG. 6 is a block diagram showing various equipment that may be used to implement various embodiments of the processes described in this document.

FIG. 6 depicts an example of internal hardware that may be included in any of the electronic components of the system, such as a mobile device having a processing capability, or a local or remote computing device that is in communication with the mobile device, or a server. An electrical bus 600 serves as an information highway interconnecting the other illustrated components of the hardware. Processor 605 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 625 that may store the programming instructions configured to implement one or more of the methodologies, procedures, or functions described herein. A memory device may include a single device or a collection of devices across which data and/or instructions are stored. Various embodiments of the disclosure may include a computer-readable medium containing programming instructions that are configured to cause one or more processors, mobile devices and/or servers to perform the functions described in the context of the previous figures. The term "computer-readable medium", as used here, refers to a single medium or multiple media (e.g., a centralized or distributed database, and/or associated caches and servers) that store the one or more sets of programming instructions. The term "computer-readable medium", as used here, also refers to any medium that is capable of storing, encoding or carrying a set of programming instructions for execution by the mobile device 120 and that cause the mobile device 120 to perform any one or more of the methodologies of the present disclosure.

An optional display interface 630 may permit information from the bus 600 to be displayed on a display device 635 in visual, graphic or alphanumeric format. An audio interface and audio output (such as a speaker) also may be provided. Communication with external devices may occur using various communication interface(s) 640 such as a wireless antenna, an RFID tag and/or short-range or near-field communication transceiver, each of which may optionally communicatively connect with other components of the device via one or more communication system. The communication interface(s) 640 may be configured to be communicatively connected to a communications network, such as the Internet, a local area network or a cellular telephone data network.

The hardware may also include a user interface sensor 645 that allows for receipt of data from input devices 650 such as a keyboard, a mouse, a joystick, a touchscreen, a touch pad, a remote control, a pointing device and/or microphone. In embodiments where the electronic device is the smartphone or another image capturing device, digital images of a document or other image content may be acquired via an image capture device 655 that can capture video and/or still images.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:
1. A mobile device comprising:
a display configured to present a user interface to a user;
a plurality of sensors; and
a processor configured to:
receive first sensor data comprising fingerprint data from at least one first sensor of the plurality of sensors,
authenticate the user based on the first sensor data,
receive second sensor data from at least one second sensor of the plurality of sensors, determine a hand of the user that is holding the mobile device based on the first sensor data and the second sensor data which are weighted differently for determining the hand of the user that is holding the mobile device, identify, based on the determination and a user profile, a first user interface to be presented on the display, subsequent to making the identification, receive a user instruction by way of detection of a pattern of movement of the mobile device indicative of one or more instructions to adjust the user interface irrespective of the hand of the user determined to be holding the mobile device, and adjust the user interface based on the received user instruction.

2. The mobile device according to claim 1, wherein the plurality of sensors include at least one of the following:
an accelerometer;
a gyroscope;
a magnetometer;
a fingerprint sensor; or
a capacitive touch sensor.

3. The mobile device according to claim 1, wherein the processor is further configured to, before receipt of the user instruction, adjust the user interface presented on the display to present the first user interface by a relocation of at least one user interaction element of the user interface from a first location to a second location, the first location being different from the second location.

4. The mobile device according to claim 3, wherein the second location makes the at least one user interface element accessible to a digit of the hand of the user that is determined to be holding the mobile device.

5. The mobile device according to claim 4, wherein the processor is further configured to position the at least one user interaction element in a lower right side of the display in response to determining that the user is holding the mobile device with the right hand.

6. The mobile device according to claim 4, wherein the processor is further configured to position the at least one user interaction element in a lower left side of the display in response to determining that the user is holding the mobile device with the left hand.

7. The mobile device according to claim 1, wherein the processor is further configured to, before receipt of the user instruction, adjust the user interface presented on the display to present the first user interface by a relocation of at least one content element of the user interface from a first location to a second location, the first location being different from the second location.

8. The mobile device according to claim 7, wherein the second location allows the user to view the at least one user content element without concealment by the hand of the user that is determined to be holding the mobile device.

9. The mobile device according to claim 8, wherein the processor is further configured to position the at least one content element in a left portion of the display in response to determining that the user is holding the mobile device with the right hand.

10. The mobile device according to claim 8, wherein the processor is further configured to position the at least one content element in a right portion of the display in response to determining that the user is holding the mobile device with the left hand.

11. The mobile device according to claim 1, wherein the processor is further configured to determine that the user is holding the mobile device with a left hand based on received data that indicates a thumb impression with an orientation from a bottom left side of the display to a top left side of the display.

12. The mobile device according to claim 1, wherein the processor is further configured to determine that the user is holding the mobile device with a right hand based on received data that indicates a thumb impression with an orientation from a bottom right side of the display to a top left side of the display.

13. The mobile device according to claim 1, wherein for purposes of determining the hand of the user that is holding the mobile device, the first sensor data from the at least one first sensor of the plurality of sensors is weighted differently as compared to the second sensor data from the at least one second sensor of the plurality of sensors.

14. The mobile device according to claim 1, wherein the finger print data is compared to stored finger print data to determine whether the finger print data is associated with a left hand digit or a right hand digit fingerprint.

15. A method for adjusting a user interface presented on a mobile device display, the method comprising, by a processor:

receiving first sensor data comprising fingerprint data from at least one first sensor of a mobile device, authenticating a user of the mobile device based on the first sensor data;

receiving second sensor data from at least one second sensor of the mobile device;

determining a hand of a user that is holding the mobile device based on the first sensor data and the second sensor data which are weighted differently for determining the hand of the user that is holding the mobile device;

identifying, based on the determination and a user profile, a first user interface to be presented on the display;

receiving a user instruction by way of detection of a pattern of movement of the mobile device indicative of one or more instructions to adjust the user interface irrespective of the hand of the user determined to be holding the mobile device; and adjusting the user interface based on the received user instruction.

16. The method according to claim 15, further comprising, adjusting, before receiving the user instruction, the user interface presented on the mobile device display to present the first user interface by relocating at least one user interaction element of the user interface from a first location to a second location, the first location being different from the second location.

17. The method according to claim 16, wherein the second location makes the at least one user interface element accessible to a digit of the hand of the user that is determined to be holding the mobile device.

18. The method according to claim 15, further comprising, adjusting, before receiving the user instruction, the user interface presented on the mobile device display to present the first user interface by relocating at least one content element of the user interface from a first location to a second location, the first location being different from the second location.

19. The method according to claim 18, wherein the second location allows the user to view the at least one user content element without concealment by the hand of the user that is determined to be holding the mobile device.

20. A mobile device comprising:
a display configured to present a user interface to a user;
a plurality of sensors; and a processor configured to:
- receive first sensor data comprising fingerprint data from at least one first sensor of the plurality of sensors,
- authenticate the user based on the first sensor data,
- receive second sensor data from at least one second sensor of the plurality of sensors,
- determine one of a left hand and a right hand of the user that is holding the mobile device based on the first sensor data and the second sensor data which are weighted differently for determining the one of the left hand and the right hand of the user that is holding the mobile device,
- adjust, based on the determination and a user profile, the user interface presented on the display,
- subsequent to making the adjustment, receive a user instruction by way of detection of a pattern of movement of the mobile device indicative of one or more instructions to adjust the user interface irrespective of the hand of the user determined to be holding the mobile device, and
- adjust the user interface presented on the display based on the received user instruction.

\* \* \* \* \*